(12) United States Patent
Hwang et al.

(10) Patent No.: US 7,941,689 B2
(45) Date of Patent: May 10, 2011

(54) MINIMIZING CLOCK UNCERTAINTY ON CLOCK DISTRIBUTION NETWORKS USING A MULTI-LEVEL DE-SKEWING TECHNIQUE

(75) Inventors: Charlie Chornglii Hwang, Hopewell Junction, NY (US); Jose Correia Neves, Poughkeepsie, NY (US); Phillip John Restle, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/051,834

(22) Filed: Mar. 19, 2008

(65) Prior Publication Data

US 2009/0237134 A1 Sep. 24, 2009

(51) Int. Cl.
G06F 1/04 (2006.01)
H03K 19/173 (2006.01)
H01L 25/00 (2006.01)

(52) U.S. Cl. ............ 713/503; 713/500; 716/16; 716/17; 716/18; 716/19; 326/37; 326/41; 326/47; 326/93

(58) Field of Classification Search .................. 713/500; 716/16, 17, 18, 19; 326/37, 41, 47, 93
See application file for complete search history.

(56) References Cited

U.S. PATENT DOCUMENTS

| | | | | |
|---|---|---|---|---|
| 5,656,963 | A * | 8/1997 | Masleid et al. | 327/297 |
| 6,356,116 | B1 * | 3/2002 | Oh | 326/93 |
| 6,378,080 | B1 * | 4/2002 | Anjo et al. | 713/500 |
| 2002/0152409 | A1 * | 10/2002 | Chu et al. | 713/320 |
| 2004/0237060 | A1 * | 11/2004 | Igarashi et al. | 716/12 |
| 2005/0075855 | A1 * | 4/2005 | Mizuno | 703/16 |
| 2005/0086424 | A1 * | 4/2005 | Oh et al. | 711/105 |
| 2009/0033398 | A1 * | 2/2009 | Dennis et al. | 327/293 |
| 2009/0189653 | A1 * | 7/2009 | Friend et al. | 327/156 |
| 2009/0210840 | A1 * | 8/2009 | Berry et al. | 716/6 |

OTHER PUBLICATIONS

Simon Tam et al., "Clock Generation and Distribution for the 130-nm Itanium2 Processor With 6-MB On-Dle L3 Cache", IEEE Journal of solid-State Circuits, vol. 39, No. 4, Apr. 2004, pp. 636-642.
Patrick Mahoney et al., "Clock Distribution on a Dual-Core, Multi-Threaded Itanium-Family Processor", 2005 IEEE International Solid-State Circuits Conference, Feb. 2005, pp. 292-293, 599.
Tim Fischer et al., "A 90-nm Variable Frequency Clock System for a Power-Managed Itanium Architecture Processor", IEEE Journal of Solid-State Circuits, vol. 41, No. 1, Jan. 2006, pp. 218-228.
Simon Tam et al., "Clock Generation and Distribution of a Dual-Core Xeon Processor with 16MB L3 Cache", 2006 IEEE International Solid-State Circuits Conference, Jan. 2006.

* cited by examiner

*Primary Examiner* — Vincent T Tran
(74) *Attorney, Agent, or Firm* — William A. Kinnaman, Jr.

(57) ABSTRACT

Disclosed is a method of minimizing clock uncertainty using a multi-level de-skewing technique. The method includes the steps of obtaining a chip wherein at least a portion of the chip has a regular array of buffers on multiple levels, the buffers being driven by first drivers and the first drivers being driven by second drivers; grouping the buffers in a first direction to create clusters with the same number of buffer inputs, wherein if there are not the same number of buffer inputs in each cluster, then adding dummy buffers to the cluster with a deficient number of buffer inputs; wiring outputs of the first drivers together in a second direction, wherein the first and second directions are orthogonal; and wiring outputs of the second together in the second direction.

12 Claims, 4 Drawing Sheets

MINIMIZING CLOCK UNCERTAINTY ON CLOCK DISTRIBUTION NETWORKS USING A MULTI-LEVEL DE-SKEWING TECHNIQUE

BACKGROUND OF THE INVENTION

In the design of very high performance integrated circuits, designers have to deal with the distribution of clock frequencies in the multi GHz domain over large chip areas while attempting to keep clock skew as low as possible. The chip area is considered large if, for a given technology, to propagate a signal from the center of the chip to the farthest edge it takes several clock cycles. The signal propagation takes into account optimal buffering and use of good wire resources. Today's large chips are in the order of tens of millimeters in width and/or height. Most design approaches follow a multi-stage style of clock distribution design. The first step is to divide the chip into smaller areas. The second step is to distribute the GHz clock signal from the PLL (phase locked loop) to these smaller areas. One design approach is to use an H-Tree to distribute the clock signal. However, this approach creates too much uncommon logic between clocks paths. To minimize that, shortening of buffer outputs at different stages of the tree is performed. However, due to the nature of H-tree, shortening is only effective at the beginning of the tree. At later stages because they are physically apart, shortening is partial within the branch of the H-tree. In another design approach the size of the H-tree is reduced by increasing the small areas the chip is divided into. This approach requires another stage of global distribution, which can be for example a clock grid. This reduces the amount of uncommon clock logic between clock paths within the H-tree, at the expense of uncommon logic between areas driven by the second stage of the tree. It would still be possible to reduce uncommon logic by connecting the clock distribution networks (CDNs) at the boundaries of the divided areas. That reduces skew at the boundary but does not affect the skew inside the area.

Clock skew is defined as the difference between two delay values measured at well defined locations in the clock distribution network, usually the inputs of gates at the same level of a distribution tree. The skew is relevant if the locations are driven by the same common source, because it measures the difference it takes for the clock to reach both locations from a common launch point. Clock skew is an important design parameter because, if not properly managed, it can cause speed slow downs (lower clock frequency) or circuit malfunctions. As such, clock skew must be controlled to avoid adverse effects. One very common design technique to control/reduce adverse impact is to minimize clock skew by designing clock distribution networks that target very low clock skew (in the single digit range).

The total clock skew between any two locations driven by the same source can be classified in two types. One is called static clock skew or the amount of skew that is obtained from the simulations of the designed clock distribution network. Parameters affecting this value are the types of buffers used in the clock distribution network, the style (or styles) of clock distribution, the types of wires used to distribute the signal and how they are laid out in the design, the accuracy of simulation models for devices and wires, the accuracy of parasitic extraction of resistance, capacitance and inductance, etc. This type of clock skew is one of the design parameters used by a designer to guide the implementation of large area clock distribution networks. For example, one clock distribution network designed to operate at 1.5 GHz over an area of 21×21 mm was simulated under the above conditions and gave design skew no higher then 1.1 ps of late mode clock skew (and 1.9 ps early mode clock skew) between any 240 pre-defined grid locations across the chip area.

The other source of clock skew is known as dynamic clock skew, because its value varies with operating conditions of the chip as well as fabrication uncertainties. In deep sub-micron design technologies geometric dimensions are not absolute values but are defined by a nominal value plus or minus a variation. For a given batch of wafers fabricated at the same time it is possible to get chips within a wafer or chips across wafers where the wire implementation for the same net has different dimensions between chips (such as variable width, cross-section and length). Likewise, wires designed with the same dimensions at different locations within a chip may have the dimensions vary after fabrication. These geometric variations also impact devices, and because clock buffers are usually much bigger than other devices they are particularly susceptible to these variations. Since large area clock distribution networks may contain hundreds and up to thousands of buffers and tens of thousands of wires it is not possible to create simulation scenarios that create all possible geometric variations that may occur during fabrication. One way to account for these geometric variations is to create a cross-section simulation model, perform worst case simulation scenarios and use the results as additional clock skew the circuits driven by the global CDN must account for. This value becomes a budget used to set the timing boundary conditions for timing analysis.

Dynamic clock skew may also be due to chip operating conditions. Device operation is susceptible to temperature variation. Operating temperature is a function of the environment as well as the types of operations performed within the chip. A large chip contains in excess of 1 billion transistors. Any percentage of transistors switching at the same time dissipate power which changes temperature and operating conditions of the devices within the area of switching activity. Global CDNs, because covering the entire chip area are susceptible to temperature variations due to almost any switching activity in the design. Furthermore, the global CDNs also cause temperature variations because of the thousands of large buffers constantly switching at GHz frequencies. Again, simulation of such conditions is beyond any real scenarios that can be conceived. Likewise the dynamic skew due to geometric variations, the uncertainty due to temperature changes is factored into the budget mentioned before. For the design example running at 1.5 GHz there were two budgets of clock skew set. One budget for early mode and the other budget for late mode timing analysis. This budget accounts for both the static and all forms of dynamic clock skew. To allow a reasonable amount of the total budget to dynamic skew, it was defined early in the project that the design of the CDN should not exceed half of the total budget (for both early and late mode budgets) in simulations. This requirement is the main driver for the new design techniques presented in the present invention.

Other factors taken into consideration during the design of large area CDNs to reduce the effects of static and dynamic skew are the total area on the chip where multi GHz clock signals must be distributed to, the style of distribution of the signal, and the number of high frequency clock signals. The present invention addresses the cases where multi GHz clock signals are widely used throughout the chip. If the design uses other frequencies, a common requirement in high performance microprocessors, these frequencies can be derived from the main frequency and are usually used in targeted small areas of the chip.

The present invention takes into account Regular CDNs where the clock signal can freely be distributed to cover the whole chip area. However, the design technique disclosed herein can also be applied to Irregular CDNs where the distribution of the clock signal is constrained to areas of the chip before it reaches the final location. This scenario is characteristic of chips using multi clock frequencies or chips where the clock signals cannot cross over large areas.

BRIEF SUMMARY OF THE INVENTION

This disclosure addresses these issues. First the chip is divided into areas that are small enough to require a distribution that can be tuned to the local clock loads. Second, the global clock tree is implemented as a two-stage tree. The second stage drives the grids to which the actual clock pins driven by the GHz clock signal are connected to. Since it depends on the placement of the driven signals, the second stage is load dependent and requires a different design approach then the first stage. Because of the small area, dynamic clock skew is very small and static skew is significantly reduced with wire and local buffer size tuning.

The first stage distributes the clock from a single source in the chip to the neighborhood of all the locations were the GHz clock signal is needed. This distribution is designed to be load independent. Because of the long distances the signal travels across the chip, this stage is very susceptible to many of the sources of static and dynamic clock skew. This disclosure provides a novel multi-level de-skewing technique that significantly reduces both static and dynamic skew for the global distribution of GHz clock signals. The style of distribution enables the shortening of output buffers within a level of the tree. This shorting technique is used across many levels of the global tree and is not dependent of the size of the chip. It is also not constrained within the last stages of the tree where the uncommon paths would be more pronounced. This effectively reduces to a minimum the amount of uncommon buffering between clock paths characteristic of H-Tree distributions. To minimize static skew within each level of the tree a new wiring structure was used that provides efficient tuning characteristics.

More particularly, the invention pertains to a method of minimizing clock uncertainty using a multi-level de-skewing technique comprising the steps of:
a. obtaining a chip wherein at least a portion of the chip has a regular array of buffers on multiple levels, the buffers being driven by first drivers and the first drivers being driven by second drivers;
b. grouping the buffers in a first direction to create clusters with the same number of buffer inputs, wherein if there are not the same number of buffer inputs in each cluster, then adding dummy buffers to the cluster with a deficient number of buffer inputs;
c. wiring outputs of the first drivers together in a second direction, wherein the first and second directions are orthogonal; and
d. wiring outputs of the second drivers together in the second direction.

This design technique can be applied to Regular CDNs where the signal can freely be distributed to cover the whole chip area. The design technique will also be applied to irregular CDNs where the distribution of the clock signal is constrained to areas of the chip before it reaches the final location. This scenario is characteristic of chips using multi clock frequencies or chips where the clock signals cannot cross over large areas.

DETAILED DESCRIPTION OF THE INVENTION

Figure 1:
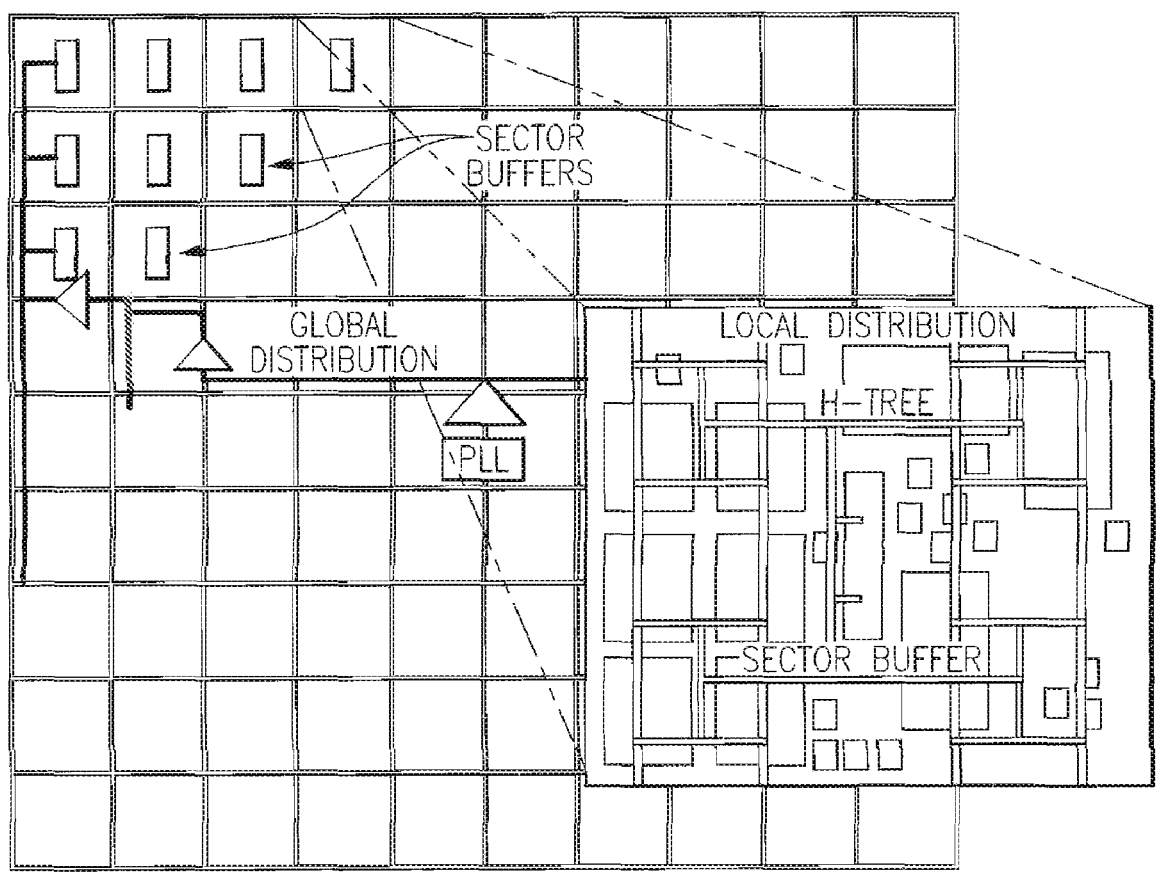
FIG. 1 is a plan view of a global clock distribution network on a chip.

In a two-stage clock signal distribution network, the first stage distributes the signal from the source, usually at the center of the chip, to intermediate pre-defined locations called sectors. These sectors form a grid overlapping the chip surface as illustrated in FIG. 1.

Each sector contains one or more buffers, called Sector Buffers, which drive the second stage of the clock distribution network. At this stage, each sector is sensitive to the load in the sector and different wiring structures as well as optimization techniques used to reduce clock skew as well as other design parameters. One such wiring structure is an H-Tree connecting to a global mesh or grid as shown in FIG. 1. Clock loads connect to the nearest grid wire as also exemplified in FIG. 1.

The clock distribution network for this part is designed such that several design parameters are carefully controlled. The main design parameter is clock skew, early and late skew. For a GHz design the objective is for the clock skew, both early and late to be in the single digits. In designing the clock distribution for a 1.5 GHz clock frequency using a multi level network with the wiring structures presented in this disclosure the worst late mode clock skew across all 240 sectors (arranged in a 16×15 grid over a chip 21×21 mm in size) was simulated at 1.1 ps while the worst early mode clock skew was 1.9 ps for sectors less then 2.5 mm apart.

To simulate under such constraints, other design parameters need to be carefully controlled. The clock slew at the input of each buffer in the tree was designed to be less then a pre-defined value. Furthermore, for a given level of the tree the clock slew was not allowed to vary more than a given range otherwise the intra-level clock skew was not obtained. The clock signal overshoot and undershoot at each tree stage could not exceed a pre-defined value and was equally monitored during corner simulations. Finally, the duty cycle of the clock signal was also monitored on all levels of the tree, the goal being a 50% duty cycle with less than 5% variation.

Designing a multi GHz clock distribution network for the aforementioned design requirements, careful attention must be paid to the placement of buffers, design of wiring structures within each level of the tree used to connect buffers, the connectivity strategy used to minimize uncommon logic between any two paths of the global clock distribution network, and the wire tuning and simulation methodologies. The focus of the present invention is on the design strategy of the clock distribution network. The size of the chip and the frequency of operation determine the number of levels on the tree. For the example of a chip operating at 1.5 GHz, there are seven levels of buffers (240 sector buffers) needed to bring the clock signal from the PLL to the Sector Buffers. In another example, a chip designed for 4.5 GHz and with similar area size, the tree has nine levels to bring the clock signal to 750

Sector Buffers. In both cases, there was a clock skew <2 ps. Generally speaking, as you increase speed, more sector buffers are needed.

A regular distribution is used when the clock signal can be distributed across the whole area of the chip. The last stage of the global clock distribution is the Sector Buffers, placed on a regular distribution as shown in FIG. 1. These are usually very tall or wide cells, the size and aspect ratio depending on the connectivity strategy to maximize load drivability and minimize clock skew within a sector. In the aforementioned examples the Sector Buffers are placed vertically, the size of the Sector dependent on the frequency of operation. For vertically placed buffers the design strategy for the distribution follows Horizontal-Vertical strategy. The PLL is placed close to the center of the chip. The clock signal is distributed horizontally to reach every single Clock Sector Column. After that, it is distributed vertically to reach every single clock Sector Buffer. Such tree will be known from now on as an HV-tree. Observe that if the Sector Buffers where placed horizontally the clock distribution would be a VH-tree.

Figure 2:
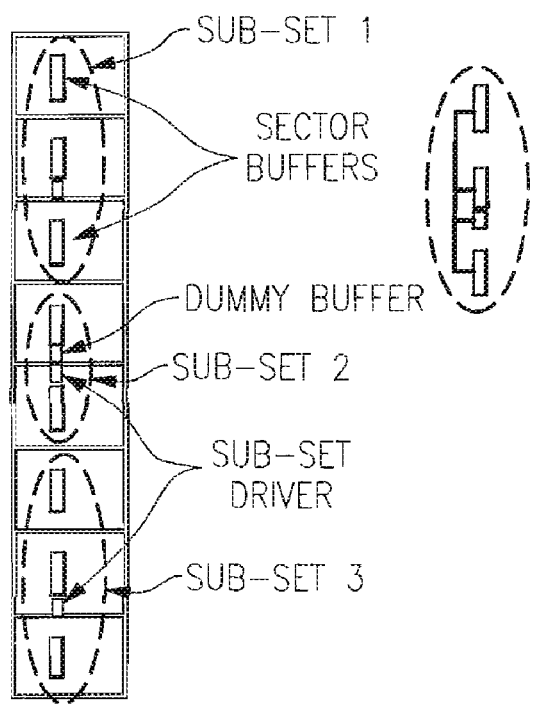
FIG. 2 schematically illustrates the vertical grouping of buffers into clusters.

The design of an HV-tree starts with the Sector Buffers. A column of Sector Buffers is divided into sub-sets of equal number of adjacent Sector Buffers. If the number of buffers within each sub-set mismatch dummy buffers are added to the smaller sub-set to equalize the load. Each sub-set is driven by one or more buffers in parallel. These buffers are placed within the buffer bay areas reserved for the Sector Buffers. The division of clock sector buffers into sub-sets is illustrated in FIG. 2. For this example, each column is divided into three sets, each with three buffers, although the middle sub-set only has two Sector Buffers. In this case a dummy buffer is added to sub-set 2. Each sub-set is driven by one or more parallel buffers. In FIG. 2 only one buffer is used to drive the sub-set.

Figure 5:
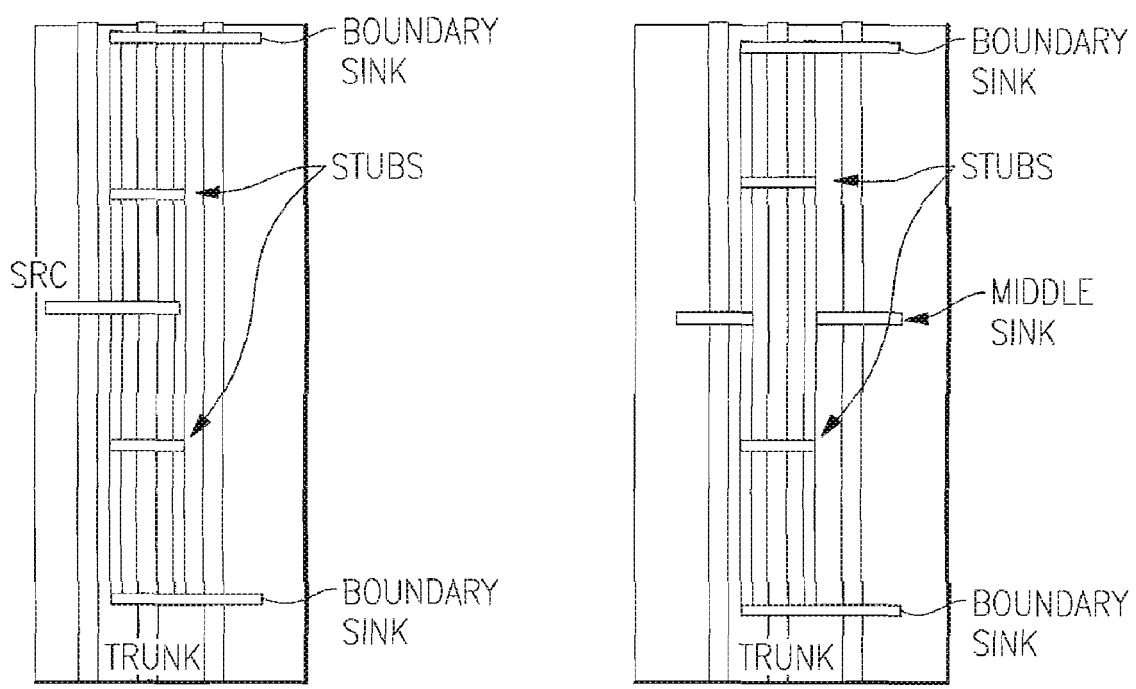
FIG. 5 schematically illustrates wiring structures for connecting clusters of two and three sinks.

Unique wiring structures are used to connect these buffers to the sector buffers. They are basically long vertical wire structures as illustrated in FIG. 2. A more detailed representation of these wires can be seen in FIG. 5. The core of the wiring structure (also unknown as FO structure) is a trunk of two or more parallel wires occupying adjacent power bays that span the distance covered by the sinks. The wires are shorted with stubs at strategic locations selected for tuning purposes. Because the length of trunks is much higher than the length of the stubs, the stubs are insignificant in terms of delay.

In a real design such as, the example described previously, these vertical wire structures can be longer than 4 mm, some times reaching 6 mm. As described in the aforementioned disclosure these wire structures are designed to provide very detailed delay control such that the clock within a stage can be minimized for simulated values of less then 1 ps. The dummy buffer in the second sub-set helps equalize the load between the sub-sets of the column. Furthermore, the wiring structures of each sub-set are made as equal as possible such that the clock skew across the sub-sets is also kept at less then 1 ps. In the design of each stage of the buffer tree, the clock skew can only be kept to a minimum (<1 ps) if the solution within one column can be reproduced for all the other columns of the grid. As such, the creation of sub-sets, addition of dummy loads, placement of sub-set drivers, and use of wire structures needs to be matched as close as possible across all the columns of the grid in FIG. 1. Therefore, each column solution must be evaluated for dummy loads, placement constraints and driving buffer size, and wiring structure requirements including the space available for placing the wires. After this evaluation, a "common" solution is created that can be fitted in all the columns. These solutions are simultaneously simulated and the clock skew measured across all the Sector buffer inputs.

Figure 3:
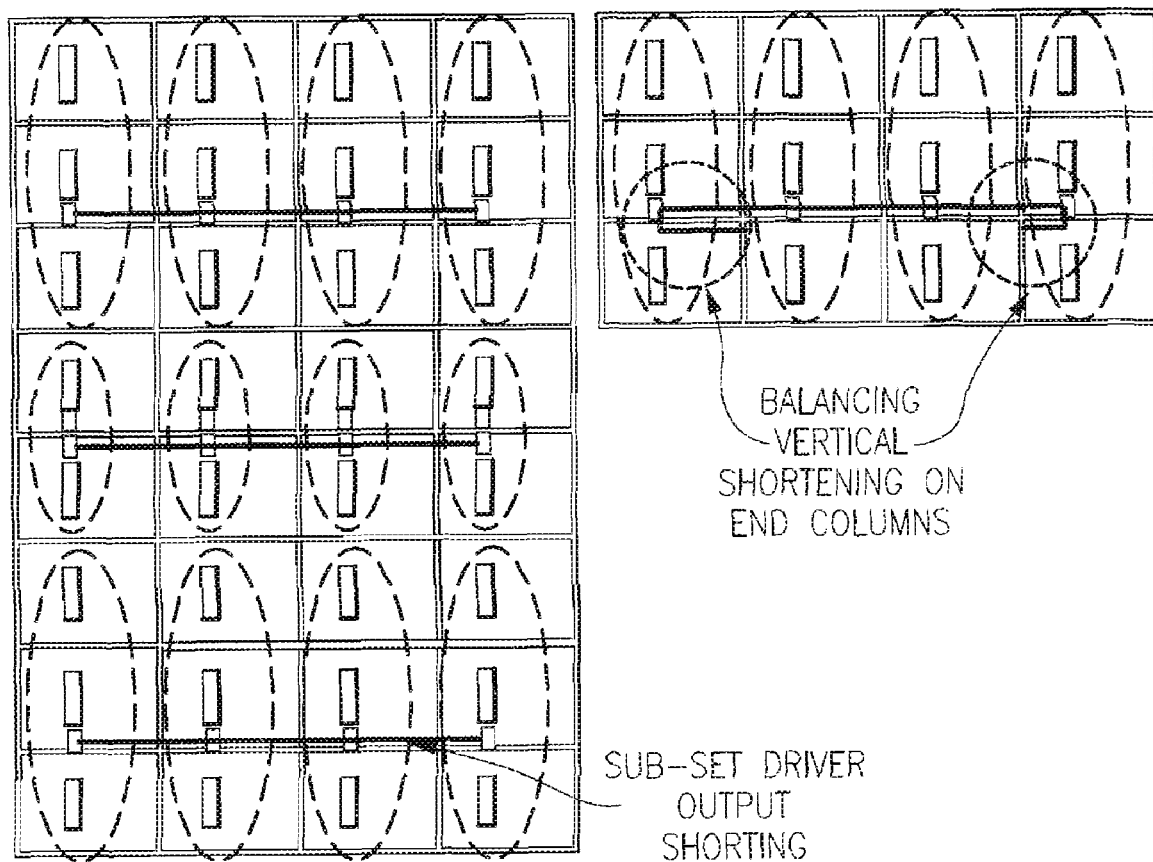
FIG. 3 schematically illustrates horizontal shorting to reduce uncommon clock path logic.

Another important aspect taken into consideration during the design of the column is the placement of the sub-set driver. As mentioned before each driver is placed in the vertical direction in the same column used by the Sector Buffer to minimize impact on placement resources used by the chip. To facilitate inter-level short-circuiting the drivers of all sub-set 1 groups of all columns are also placed in the "same" y coordinate if permitted by chip placement constraints. Once this is in place the outputs of all drivers are shorted by a single vertical wire to reduce uncommon clock path logic, as illustrated in FIG. 3.

Observe that the success of this design structure is possible if the placement and wiring resources are available to place the Sector Buffers and sub-set drivers across all columns in similar x and y coordinates. In real implementations the Buffer Sectors may not be lined up in the vertical within a column, and the common solution strategy to drive all columns described before must reflect that characteristic. Furthermore, it may not be possible to line all the sub-set drivers in the y dimension. To accommodate for these differences the horizontal wire to shorten the drivers is not a single wire but a wire structure that can be tuned to the different distances between columns.

The tuning of the horizontal wiring structure also takes into account the connectivity to the left and right most Sector Buffer columns. The sub-set driver of each internal column connects to two adjacent drivers, one on the left and one on the right. The sub-set driver on the first and last column only has one adjacent column requiring theoretically half of wiring to connect to the adjacent buffer. As such the horizontal wiring structure connecting these buffers needs to have the additional wire as if it was connecting to another sub-set buffer on another column. This extra wire is illustrated in the right side of FIG. 3 (note that only 3 wiring levels are shown for clarity).

Figure 4:
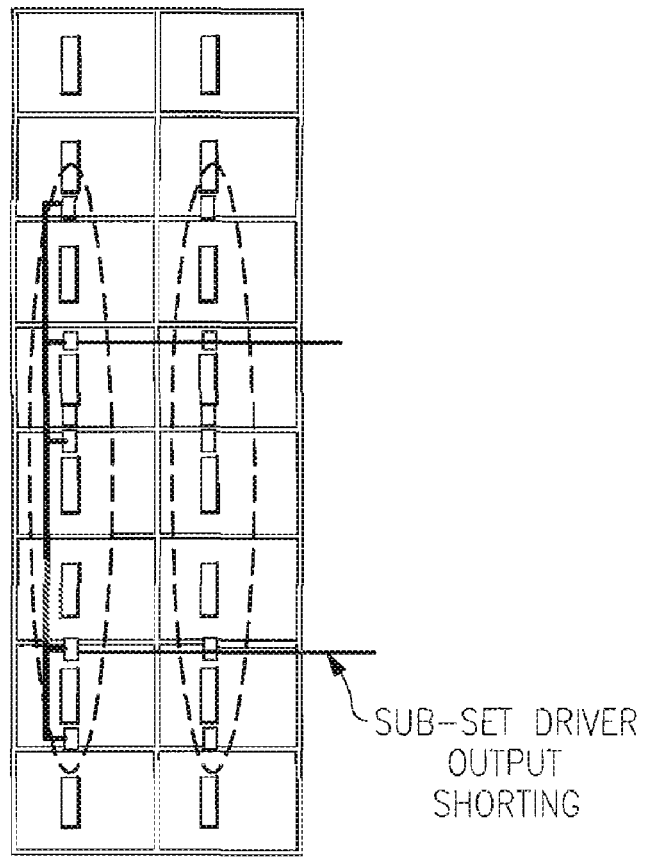
FIG. 4 schematically illustrates the shorting of the outputs of the drivers of the buffer drivers.

Once all the sub-sets are created, placed and wired, a new level of the tree can be re-built. The procedure to create sub-sets, find a placement for the driver of each sub-set, and wiring of sub-sets is repeated. For the example in FIG. 3, since there are only three buffers per column, these can be grouped into one sub-set and driving by one or more buffers. In this case two buffers are preferred because of the distances, as illustrated in FIG. 4. In this case, because of the distances two buffers are used to drive the single sub-set of each column. Each buffer drives one and half buffer loads. Therefore, to account for placement differences across columns and within a column extra wiring is used to ensure that clock skew within the sub-set and across all sub-sets are less then 1 ps. Also, notice that the buffers driving the sub-set on each column are again short circuited to reduce uncommon logic across the global CDN. Likewise in the previous case, the shortening on the left and right most columns have the extra wire to account for the missing column. Note extra wire is also added to the buffers of internal columns to account for differences in size of the columns and placement location of the buffers inside the columns.

The two buffers within the column will then be the sinks of the next stage requiring a buffer per column to drive them. Again, the output of these buffers would be shortened. In this example, the global CDN required three levels of buffers to properly drive all the Sector Buffers on each Column. Along the way, clustering of sinks, choice of buffers to drive each cluster, placement of the buffers, wiring of buffers, and shortening of buffers in the "horizontal" direction, is performed such that the low skews are obtained within each sub-set, across all sub-sets within a level and at the input of all Sector Buffers.

The number of vertical stages is dependent on the size of the chip, the size of each sector (a function of the GHz frequency) and the performance constraints, such as clock skew, sub-set buffer input slew, signal overshoot and undershoot at sub-set buffer input, duty cycle constraint on each level, etc. A unique feature of this design strategy is that every stage of the vertical implementation has the outputs shortened, enabling a multi-level de-skewing approach that significantly reduces uncommon logic in the global CDN no matter the size of the chip or the frequency of operation. For the design example, working at 1.5 GHz and 21×21 mm size, four stages were needed.

The next step of the design of the global CDN is the design of the horizontal portion of the VH-tree. This portion is needed to drive the vertical buffers of each column from the central location where the PLL is located.

Similar to the vertical design the first step is to cluster sinks making sure that each cluster is balanced from a load standpoint with the addition of dummy loads if necessary. The challenge for this portion of the global CDN is that the sub-set buffers are constrained in placement to the reserved spaces initially defined for the Sector Buffers and vertical buffers. This constraint limits how many buffers each sub-set buffer can drive and the wiring resources needed to connect the buffers. Like in vertical design, clock skew within a sub-set and across sub-sets must be designed to meet design specifications. The procedure to design the horizontal portion follows the same procedure to design a single column. Unless vertical design, horizontal design does not need to look at multiple columns to define cluster size, sub-set buffer size, and placement of the sub-set buffers. It is still necessary define the sub-sets to facilitate equalization of clock skew within and across sub-sets. The number of stages in the horizontal domain is recursively designed until we reach the PLL. Unlike the vertical approach the horizontal portion does not need shortening at the output of each vertical stage.

To guarantee quality of results, the VH-tree design flow described previously uses SPICE simulation of fully extracted netlists including RLC parasitics from the PLL across each stage for all the sinks within each stage. To prevent coupling noise and false switching noise The difference between this type of global CDN and the previous one is that the global signal cannot be distributed in specific areas of the chip which are blocked. To design the global CDN using the strategy previously described, the chip is first divided into sector buffers. The columns and rows are adjusted to line up with the edges of the blocked areas. Similarly, clock Sector Buffers are placed within each sector in pre-defined locations, preferably in areas close to the middle as before.

The approach previously outlined can be applied to this design considering that dummy loads can be added to sub-sets to compensate for the Sector Buffers needed in the blocked areas. This approach requires more physical resources in the areas adjacent to blocked areas. These physical resources are needed for the extra dummy buffers and extra wiring needed to obtain the balanced tree. Observe that this design still needs the same number of buffers between the PLL and each Sector Buffer, therefore the need for the dummy stages. The multi-level de-skewing technique is still applied to the buffers driving the sub-sets of vertical buffers but it does not have to go across the chip since it is very unlikely that the lower left corner of the chip talks synchronously with logic located in the lower right corner of the chip.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

The invention claimed is:

1. A method of minimizing clock uncertainty using a multi-level de-skewing technique comprising the steps of:
    obtaining a chip wherein at least a portion of the chip has a regular array of sector buffers on multiple levels arranged in columns and rows, wherein the columns are in a first direction and the rows are in a second direction;
    grouping the sector buffers in each column of buffers to create clusters with the same number of buffer inputs, wherein if there are not the same number of buffer inputs in each cluster, then adding at least one dummy buffer to the cluster that has a deficient number of buffer inputs;
    driving each cluster of sector buffers in each column of buffers with at least one first driver buffer;
    wiring outputs of the first driver buffers to outputs of first driver buffers in adjacent columns of buffers;
    grouping the first driver buffers in the columns of buffers to create clusters in each column of buffers with the same number of buffer inputs, wherein if there are not the same number of buffer inputs in each cluster, then adding at least one dummy buffer to the cluster that has a deficient number of buffer inputs;
    driving each cluster of first driver buffers in each column of buffers with at least one second driver buffer;
    wiring outputs of the second driver buffers to outputs of second driver buffers in adjacent columns of buffers;
    continuing grouping driver buffers in each column of buffers into clusters, driving the clusters with driver buffers, and wiring the outputs of such driver buffers in adjacent columns of buffers until only one last driver buffer results in each column of buffers;
    grouping the last driver buffers into rows of buffers into clusters having the same number of buffer inputs, wherein if there are not the same number of buffer inputs in each cluster, then adding at least one dummy buffer to the cluster that has a deficient number of buffer inputs;
    driving each cluster of last driver buffers in the rows of buffers with at least one second direction driver buffer;
    grouping the second direction driver buffers into clusters having the same number of buffer inputs, wherein if there are not the same number of buffer inputs in each cluster, then adding at least one dummy buffer to the cluster that has a deficient number of buffer inputs;
    continuing grouping second direction driver buffers into clusters in the second direction and driving the clusters until only one last driver buffer in the second direction results; and
    wiring the last second direction driver buffer to an output of a PLL.

2. The method of claim 1 wherein the columns are arranged vertically and the rows are arranged horizontally.

3. The method of claim 1 wherein the columns are arranged horizontally and the rows are arranged vertically.

4. A method of minimizing clock uncertainty using a multi-level de-skewing technique comprising the steps of:
    obtaining a chip wherein at least a portion of the chip has a regular array of sector buffers on multiple levels arranged in lines of buffers in first and second directions;
    grouping the sector buffers in each line of buffers in the first direction (first direction line of buffers) to create clusters with the same number of buffer inputs, wherein if there are not the same number of buffer inputs in each cluster, then adding at least one dummy buffer to the cluster that has a deficient number of buffer inputs;

driving each cluster of sector buffers in each first direction line of buffers with at least one first driver buffer;

wiring outputs of the first driver buffers to outputs of first driver buffers in adjacent first direction lines of buffers;

grouping the first driver buffers in first direction lines of buffers to create clusters in each first direction line of buffers with the same number of buffer inputs, wherein if there are not the same number of buffer inputs in each cluster, then adding at least one dummy buffer to the cluster that has a deficient number of buffer inputs;

driving each cluster of first driver buffers in each first direction line of buffers with at least one second driver buffer;

wiring outputs of the second driver buffers to outputs of second driver buffers in adjacent first direction lines of buffers;

continuing grouping driver buffers in each first direction line of buffers into clusters, driving those clusters with driver buffers, and wiring the outputs of such driver buffers in adjacent first direction lines of buffers until only one last driver buffer results in each first direction line of buffers;

grouping the last driver buffers in a second direction into clusters having the same number of buffer inputs, wherein if there are not the same number of buffer inputs in each cluster, then adding at least one dummy buffer to the cluster that has a deficient number of buffer inputs;

driving each cluster of last driver buffers in the second direction with at least one driver buffer;

grouping the driver buffers into clusters having the same number of buffer inputs, wherein if there are not the same number of buffer inputs in each cluster, then adding at least one dummy buffer to the cluster that has a deficient number of buffer inputs;

driving each cluster of driver buffers in the second direction with at least one second driver buffer;

continuing grouping second direction driver buffers into clusters in the second direction and driving those clusters with driver buffers until only one last driver buffer in the second direction results; and wiring the last second direction driver buffer to an output of a PLL.

5. The method of claim 4 wherein extra shortening wiring is added to the buffers on the periphery of the chip.

6. The method of claim 4 wherein the first direction is horizontal and the second direction is vertical.

7. The method of claim 4 wherein the first direction is vertical and the second direction is horizontal.

8. The method of claim 4 wherein the sector buffers are arranged such that the first and second directions are columns and rows.

9. The method of claim 8 wherein the columns are arranged vertically and the rows are arranged horizontally.

10. The method of claim 4 wherein the sector buffers and driver buffers are arranged in the form of a tree.

11. The method of claim 10 wherein the tree is a horizontal-vertical tree.

12. The method of claim 10 wherein the tree is a vertical-horizontal tree.

* * * * *